Figure 1:
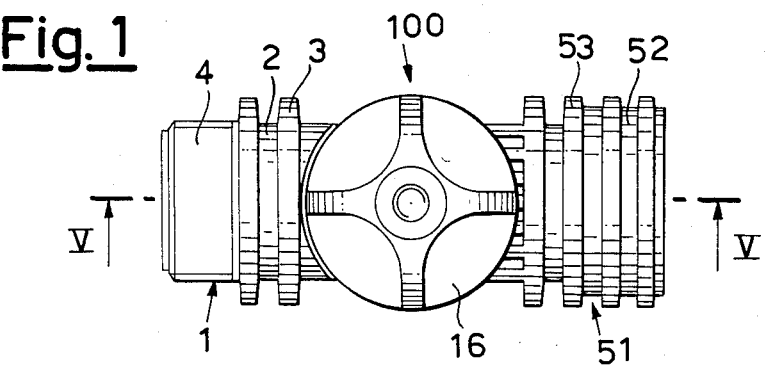

United States Patent [19]

Roman

[11] Patent Number: 4,717,180

[45] Date of Patent: Jan. 5, 1988

[54] WATERTIGHT JOINT FOR RIGID PIPING, IN PARTICULAR FOR THE ARTICULATION OF A WASHING BRUSH FED WITH WATER

[75] Inventor: Gianfranco Roman, Pasiano, Italy

[73] Assignee: Claber S.p.A., Italy

[21] Appl. No.: 921,604

[22] Filed: Oct. 20, 1986

[30] Foreign Application Priority Data

Nov. 14, 1985 [IT] Italy ................................ 23828/85[U]

[51] Int. Cl.$^4$ .............................................. F16L 55/00
[52] U.S. Cl. ...................................... 285/175; 285/185; 285/910
[58] Field of Search ............... 285/123, 185, 184, 262, 285/910, 175

[56] References Cited

U.S. PATENT DOCUMENTS

| | | | |
|---|---|---|---|
| 451,300 | 4/1891 | Drew | 285/185 X |
| 586,841 | 7/1897 | Drew | 285/185 |
| 1,080,669 | 12/1913 | Ziegler | 285/184 X |
| 1,232,473 | 7/1917 | Andersen | 285/185 |
| 2,423,069 | 6/1947 | McElhose et al. | 285/184 X |
| 4,543,007 | 9/1985 | Quiogue | 285/185 X |

*Primary Examiner*—Dave W. Arola
*Attorney, Agent, or Firm*—Steele, Gould & Fried

[57] ABSTRACT

The joint is formed of two parts coupled with a variable angle. The two joint parts have coupling surfaces traversed by a rotation pin disposed perpendicularly to the longitudinal direction of the joint. Respective toothed crowns of the two coupling surfaces describe predetermined variable angular positions of the two joint parts. A seal with two concentric rings is placed between said coupling surfaces.

3 Claims, 6 Drawing Figures

WATERTIGHT JOINT FOR RIGID PIPING, IN PARTICULAR FOR THE ARTICULATION OF A WASHING BRUSH FED WITH WATER

The present invention relates to a watertight joint for rigid piping, in particular for the articulation of a washing brush fed with water.

The making of a joint between rigid pipes clearly presents certain difficulties, especially concerning the watertightness to be provided in the articulation area.

At the same time a joint truly effective in this way is useful in many applications. This is the case for example with known water-fed washing brushes much in use especially for washing motor vehicles. In such brushes a joint associated with the handle of the brush would permit direction of said brush in relation to the handle for washing areas of the motor vehicle difficult to accede to.

The object of the present invention is accordingly to produce a joint for rigid pipes which would permit free variation of the angle created by two pipes without creating watertightness problems when said joint is traversed by water or any other liquid such as for example during use of the water-fed washing brush with applied joint.

In accordance with the invention said object is achieved with a joint characterized in that it is formed of two parts coupled with a variable angle each of which comprises a first tubular portion fixable to a rigid pipe and traversed by an axial passageway and a second tubular portion coupled with variable angle to a corresponding second tubular portion of the other joint part and traversed by an annular passageway communicating with said axial passage of the first portion and perpendicular thereto, said second tubular portion being formed of a cylindrical side wall and a coaxial central hub which together describe said annular passageway and terminate with a common transversal coupling surface traversed by said annular passage and having a peripheral crown of teeth engaging with corresponding teeth of the corresponding transversal surface of the other joint part, and there being provided a rotation pivot passing axially through the central hubs of the second tubular portions of the two joint parts, a locknut screwable onto a threaded end of said rotation pivot to force said transversal surfaces together with the teeth thereof mutually engaged to describe a desired angular position of the two joint parts and a seal having two concentric rings interposed between said transversal surfaces at said central hubs and said side walls.

It appears clear that with the locknut screwed down the two joint parts remain locked in a certain angular position which allows free flow of water or other liquid from one axial passageway to the other through the two opposing annular passages while at the same time ensuring perfect watertightness thanks to the seal interposed and gripped between the cooperating surfaces of the two parts of the joint.

If it is desired to change the angle of the joint it is sufficient to unscrew the locknut enough to permit mutual disengagement of the two toothed crowns. At this point the two parts of the joint can be rotated freely until there is found the new angular position desired and then made stable and watertight by again screwing down tightly the locknut.

A joint thus formed can be used with benefit as already mentioned in a water-fed washing brush. Placed between the brush handle and an extension thereof acting as a grip, both formed with rigid pipes fed with washing water, it permits inclination of the brush in relation to the handle to reach surfaces of difficult access or peculiar shape. In practice it becomes possible thus to equip the brush with an articulation similar to the human wrist.

Figure 2:
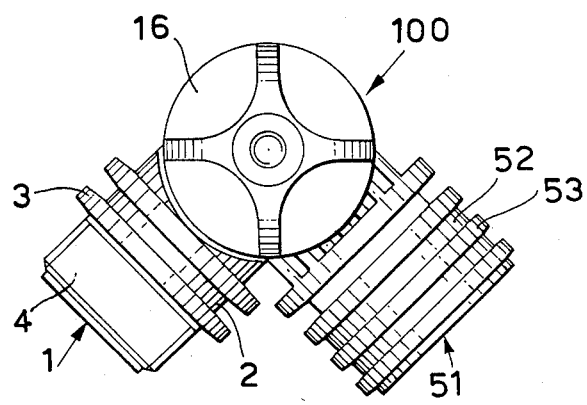
Figure 3:
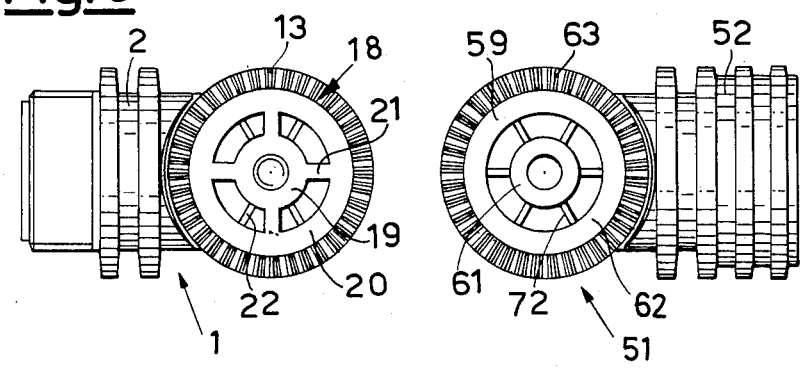
Figure 4:
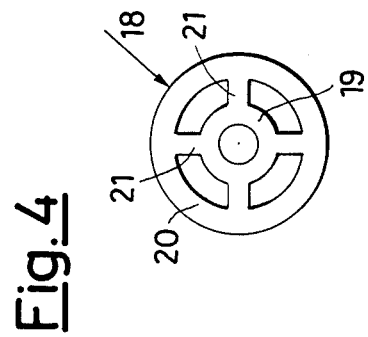
Figure 5:
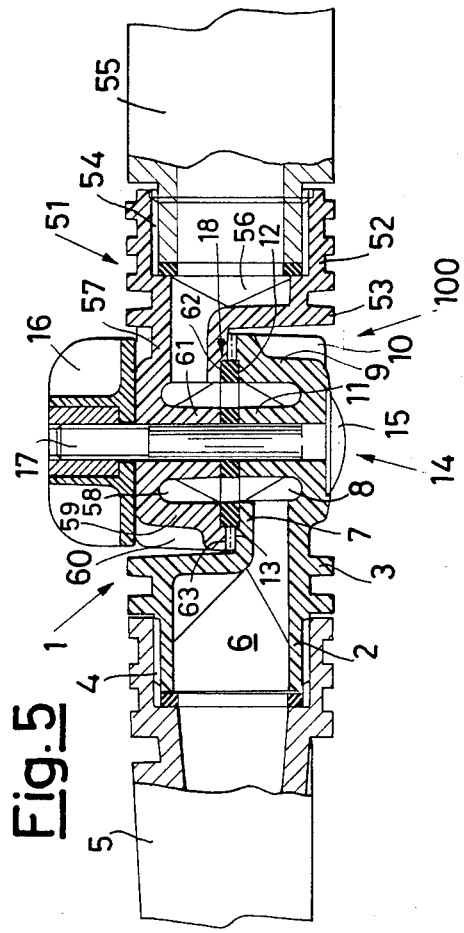
Figure 6:
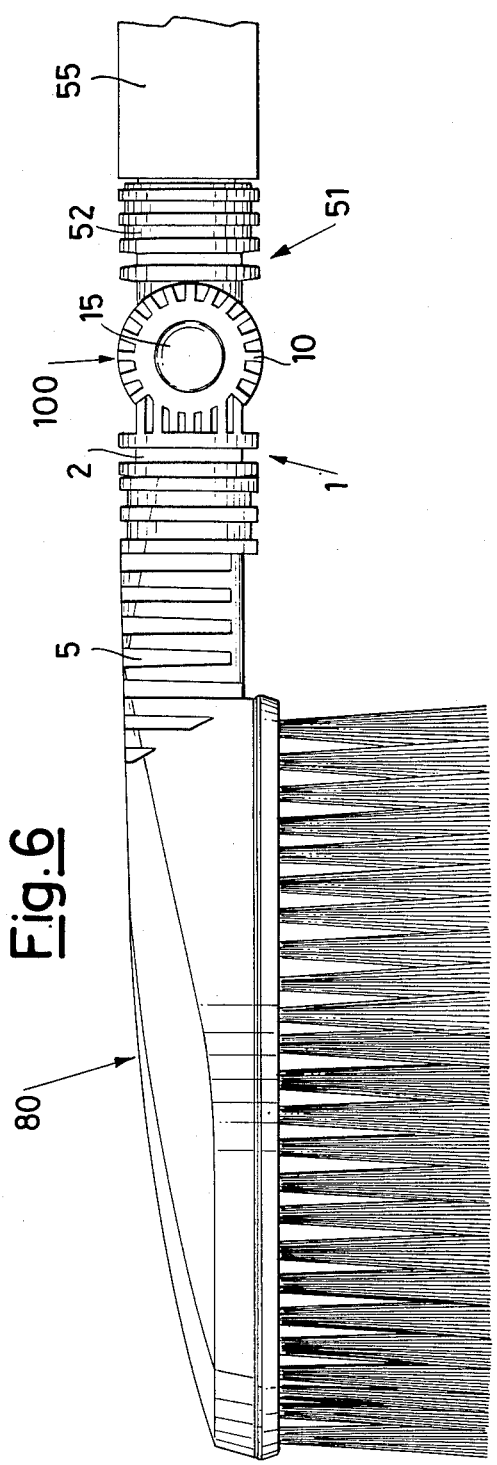

An example of a practical embodiment of the joint in accordance with the invention is illustrated for greater clarity in the annexed drawings wherein FIG. 1 shows a side view of the joint in accordance with the invention with the two joint parts in alignment with each other, FIG. 2 shows a side view of the same joint with the two joint parts disposed at an angle, FIG. 3 shows the two joint parts separated in views turned toward their coupling surfaces, FIG. 4 shows a plan view of a detail of the seal placed between said coupling surfaces, FIG. 5 shows a longitudinal section of said joint along line V—V of FIG. 1 placed so as to join two rigid pipes, and FIG. 6 shows the application of said joint to a water-fed washing brush.

The joint illustrated in the drawings is formed of two parts 1 and 51 coupled with variable angle and one partially superimposed on the other. In particular the aligned arrangement as shown in FIG. 1 and various angled arrangements as in FIG. 2 are possible.

As can be seen in FIGS. 3 and 5 each of the two joint parts 1 and 51 comprises a first tubular portion 2, 52 respectively fitted with external finning 3, 53 and with end threading 4, 54 (the first external, the second internal) for detachable fixing of the two joint parts to rigid pipes 5, 55. An axial passage 6, 56 traverses said first tubular portion from one end to the other thereof.

Each joint part 1, 51 comprises also a second tubular portion 7, 57 integral with and half as high as the first which is traversed by an annular passage 8, 58 communicating with said axial passage 6, 56 and perpendicular thereto. As shown in FIGS. 3 and 5 said second tubular portion 7, 57 is formed of a cylindrical side wall 9, 59 having external finning 10, 60 and of a coaxial central hub 11, 61 having radial connecting ribs 22, 72 which describe said annular passage 8, 58 and terminate with a common transversal surface 12, 62 designed for coupling with the corresponding transversal surface 62, 12 of the other joint part. As shown in FIG. 3 each of said coupling surfaces 12, 62 has a peripheral toothed crown 13, 63 engageable with corresponding teeth 63, 13 of the corresponding surface 62, 12 to describe a desired mutual angular position of the two joint parts.

A rotation pin 14 with widened head 15 is made to pass axially through the two central hubs 11, 61 and a locknut 16 is screwed onto a threaded end 17 of the pin 14 to clamp the two coupling surfaces 12, 62 against each other with the respective teeth 13, 63 thereof in mutual engagement.

A seal 18 formed of two concentric rings 19, 20 made integral by radial spokes 21 (FIG. 4) is placed and clamped between the coupling surfaces 12, 62 at the central hubs 11, 61 and the side walls 9, 59 inside the crown of teeth 13, 63 and outside the rotation pin 14 (FIGS. 3 and 5) in order to achieve watertightness at the sides of the aligned annular passageways 8, 58.

With the locknut 16 screwed down fully as shown in FIG. 5 the two joint parts 1, 51 are clamped in the previously determined angular position which can be as shown in FIG. 1 or as shown in FIG. 2 or an intermediate position between them. Under said condition water or another liquid can pass from one of the axial passageways 56, 6 to the other or vice versa through the annular passageways 58, 8 or vice versa without loss due to lack of watertightness thanks to the seal 18.

To modify the mutual angular position of the joint parts 1, 51 it is sufficient to partially unscrew the locknut 16 in such a manner as to allow separation of the coupling surfaces 12, 62 to secure disengagement of the teeth 13, 63. The two joint parts 1, 51 can thus be rotated around the axis of the pin 14 until they reach the desired new angular position. At this point the locknut 16 is again screwed down to clamp the two joint parts 1, 51 in the position reached and at the same time clamp the seal 18 to secure perfect watertightness of the joint.

In FIG. 5 the joint, which is indicated as a whole with reference number 100, is shown connecting two rigid pipes 5, 55. In particular this can be the handle and an extension of the grip of a water-fed washing brush, e.g. for motor vehicles, such as the one indicated by reference number 80 in FIG. 6. In such a manner the brush is equipped with an articulation similar to the human wrist so as to be able to accede to particular zones and shapes of the surface to be washed. A brush suitable for the employment of a joint thus made is for example as shown in FIG. 6.

I claim:

1. Watertight joint for rigid pipes in particular for the articulation of a water-fed washing brush, comprising:
   two joint parts coupled with a variable angle, each of which has a first tubular portion fixable to a rigid pipe and traversed by an axial passage and a second tubular portion coupled at a variable angle to a corresponding second tubular portion of the other of said two joint parts and traversed by an annular passage communicating with said axial passage of the first portion and perpendicular thereto, said second tubular portion being formed of a cylindrical side wall which defines said annular passage and terminates in a transversal surface for coupling said two joint parts, the transversal surface being traversed by said annular passage and having a peripheral crown of teeth engageable with corresponding teeth of the corresponding transversal surface of the other of said two joint parts, and there being provided a rotation pin passing axially through central hubs of the second tubular portions of the two joint parts, a lock nut screwable on a threaded end of said rotation pin to clamp said transversal surfaces against each other with the respective teeth thereof mutually engaged to thereby orient at a desired angular position the two joint parts, and a seal with two concentric rings placed between said transversal surfaces at said central hubs and at said side walls, the two concentric rings being connected by radial spokes, an outer one of the two concentric rings being disposed radially inside the peripheral crown of teeth.

2. Joint in accordance with claim 1 characterized in that said second tubular portion has a length essentially equal to the diameter of said first tubular portion.

3. Joint in accordance with claim 1 characterized in that said first tubular portion of one of said joint parts has external terminal threading while that of the other joint part has internal terminal threading.

* * * * *